United States Patent [19]

Rucker

[11] 4,079,570
[45] Mar. 21, 1978

[54] QUICK-CHANGE HEATSEAL DIE FOR FORMING EASY-OPEN PRACKAGES

[75] Inventor: George I. Rucker, Dublin, Calif.

[73] Assignee: Crown Zellerbach Corporation, San Francisco, Calif.

[21] Appl. No.: 776,060

[22] Filed: Mar. 9, 1977

[51] Int. Cl.$^2$ .................... B65B 51/14; B65B 51/30
[52] U.S. Cl. .................................. 53/39; 53/373; 156/290; 156/581; 156/583
[58] Field of Search ............... 53/39, 180 R, 180 M, 53/182 R, 182 M, 373; 156/290, 581, 583; 93/DIG. 1

[56] References Cited

U.S. PATENT DOCUMENTS

| | | | |
|---|---|---|---|
| 2,227,497 | 1/1941 | Hallman | 156/583 X |
| 2,435,560 | 2/1948 | Richens | 93/DIG. 1 |
| 2,626,494 | 1/1953 | Lewis | 93/DIG. 1 |
| 2,884,988 | 5/1959 | D'Angelo | 53/373 X |
| 3,016,667 | 1/1962 | Kerhoas | 53/182 |
| 3,932,260 | 1/1976 | Balentine | 156/290 X |
| 4,001,075 | 1/1977 | Menzner et al. | 156/581 |

*Primary Examiner*—Robert Louis Spruill
*Attorney, Agent, or Firm*—Stanley M. Teigland; Corwin R. Horton

[57] ABSTRACT

This invention is a heatseal die which is intended to replace one die of a pair of heatseal dies normally employed in a packaging machine. The die of the invention differs from the die normally employed in that the lower portion of the die face, which forms the heatseal at the top of the package, has ribs which are horizontal instead of vertical. Being horizontal, the ribs intersect the vertical ribs of an opposing die, instead of meshing with them as the ribs of the die normally employed do. The pattern of point seals formed where the ribs intersect forms a good gastight seal but reduces the force required to break the seal, thereby permitting the package to be opened more easily. In a preferred embodiment, the lower portion of the die face is detachable so it can be easily replaced with another die face having a different rib pattern, so that when it is desired to run a film having different heatseal characteristics on the packagaing machine, the die face can be quickly replaced with one which is better suited for the differnt heatseal characteristics.

9 Claims, 2 Drawing Figures

QUICK-CHANGE HEATSEAL DIE FOR FORMING EASY-OPEN PRACKAGES

Bags used for packaging potatoe chips and other snack foods are typically made by forming a tube from a film having a heatsealable surface, with the heatsealable surface forming the interior surface of the tube, and then forming a transverse heatseal across the tube by pressing the tube between heated, opposed die faces. The die faces are typically ribbed, with the ribs of one face being aligned parallel to the ribs of the other face, but offset slightly, so that the ribs of one face mesh with the grooves between the ribs on the other die face. In this way, a strong, gastight heatseal is formed. However, the heatseal tends to be too strong, making the package difficult to open. To overcome this problem, attempts have been made to formulate special polymer combinations which form a heatseal which can be opened easily. However, requiring the use of more exotic polymers, such attempts usually increase the cost of making the package. This invention overcomes the problem more economically, and with more flexibility, by aligning the ribs of the respective die faces at an angle, rather than parallel, so that the ribs form point seals where they intersect. A pattern of such point seals forms a good gastight heatseal while reducing the force required to break the seal and thereby open the package.

Figure 1:
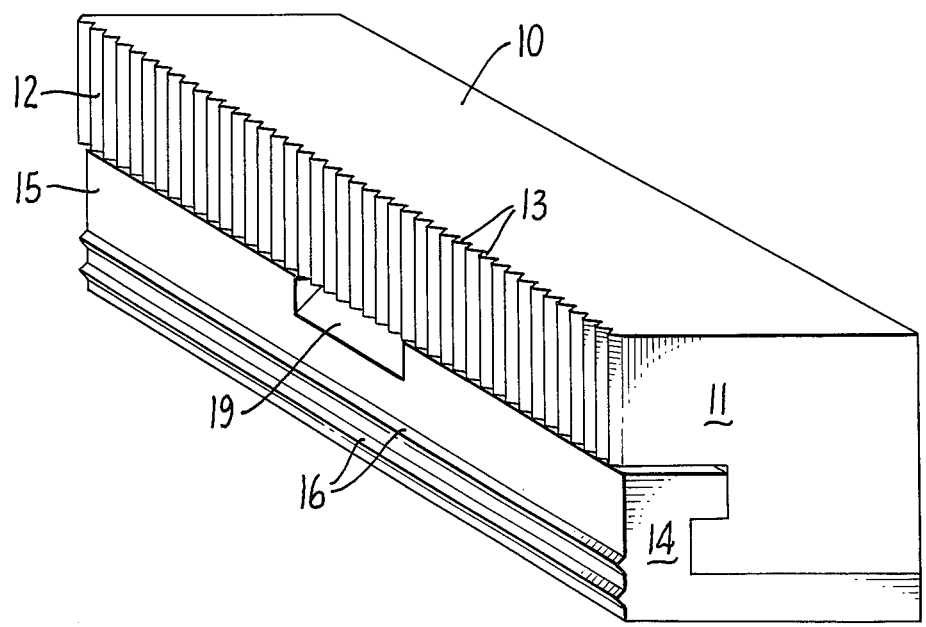
FIG. 1 shows a preferred embodiment of the heatseal die of this invention.
Figure 2:
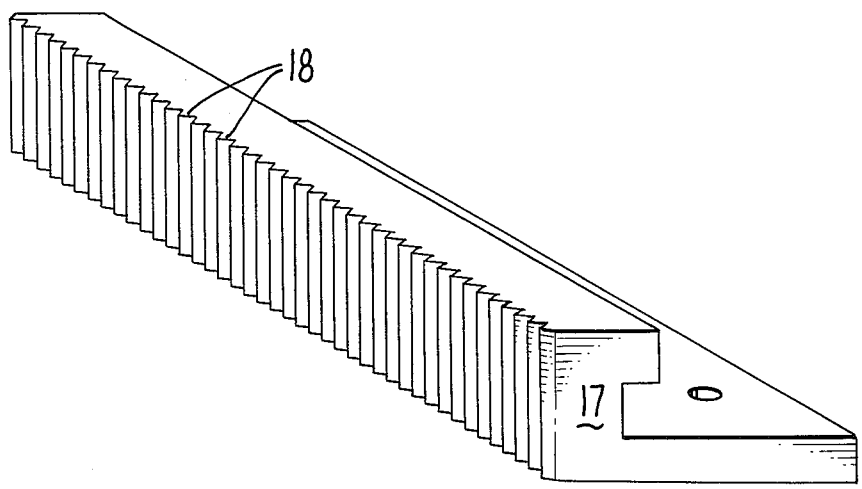
FIG. 2 shows a die bar which may be substituted for the corresponding die bar in FIG. 1 to convert the die of FIG. 1 into one which resembles a conventional die.

The die 10 shown in FIG. 1 comprises a first die bar 11 having a die face 12 with parallel ribs 13, and a second detachable die bar 14 having a die face 15 with parallel ribs 16. The longitudinal axes of the die bars 11 and 14 are generally parallel; and the ribs 13 are aligned normal to the longitudinal axes while the ribs 16 are aligned parallel to the longitudinal axes. The die bar 14 is preferably detachable so it can be quickly and easily replaced with another die bar having the same general dimensions but a different die face, such as the die bar 17 shown in FIG. 2. When the die bar 17 is substituted for the die bar 14, the resultant die resembles the die of the prior art, with the exception that in the dies of the prior art the die bars are not detachable or replaceable.

Opposing the die 10 shown in FIG. 1 is a conventional back die (not shown) having a die face with ribs which mesh (ridge-in-groove) with the ribs 13 of the die 10. When the die bar 17 is substituted for the die bar 14, the ribs of the back die also mesh with the ribs 18 of the die bar 17.

When a tube of plastic film having a heatsealable interior surface is pressed between the die 10 shown in FIG. 1 and the back die, two heatseals are formed. One heatseal, which has a serrated surface and is difficult to open, is formed between the die bar 11 and the back die. The other heatseal, which is easy to open but which is nevertheless gastight, is formed between the die bar 14 and the back die. Because the ribs 16 of the die bar 14 form an angle of 90 degrees with the ribs of the back die, the ribs form point seals at the intersections where they contact. These point seals form a good gastight seal which is easily opened.

Of course, the die 10 and the back die are heated to an appropriate temperature, as conventional in the art, to effect the heatseals. In a typical operation, the dies are heated to about 190° F and the film is held between the dies for about one-half second.

The heatseal formed between the die bar 11 and the back die forms the bottom of a bag, such as a potato chip bag, formed from the tube of plastic film. The heatseal formed between the die bar 14 and the back die forms the top of another bag. As the two heatseals are formed, a knife (not shown) emerges from a slot in the back die and enter the gap in the die 10, thereby severing the tube of plastic film and separating the two bags. This cutting operation is conventional in the art.

In a preferred embodiment of the invention, the ribs 16 of the die bar 14 are set at a sufficient distance below the knife so that there are two layers of unsealed film between the heatseal and the top of the bag that can be easily grasped between the thumbs and forefingers to open the bag. At times, however, the knife tends to seal the top of the bag together. To ensure that at least a section of the top of the bag remains unsealed so that the two layers can be grasped to open the bag, the die bar 14 preferably has a recess 19 along its top edge. The recess is at least wide enough to ensure that a graspable edge is formed; i.e., the width of the recess is at least about 2 inches, and preferably at least about three inches. However, the recess does not extend to either end of the die bar 14 since the ends restrain the film to facilitate cutting it. In a preferred embodiment, the recess is an approximately 45° bevel which extends about half the distance from the top edge of the die bar 14 to the first rib, and is located substantially at the center of the edge.

The number of ribs 16 on the die face 15 can vary, depending on the strength of the heatseal formed by the heatseal layer. For example, the embodiment shown in FIG. 1 is particularly suitable for use with a film having a heatseal surface of ethylene-vinyl acetate copolymer on a high density polyethylene substrate. Such a film tends to form a strong heatseal, so that only two ribs 16 are needed to form a gastight heatseal at the top of the bag that is easily opened. The heatseal formed at the bottom of the bag (which would be the same as the heatseal formed at the top of the bag using the dies of the prior art) is so strong that it cannot be opened without tearing the film. If a different film tending to form a weaker heatseal is used, the number of ribs 16 can be increased to form a heatseal which is gastight and which can withstand normal handling without opening before actual use, but which can be easily opened when desired.

Similarly, the ribs 16 can be aligned at an angle with respect to the longitudinal axis of up to about 85° (corresponding to an angle of up to 5° with respect to the ribs of the back die) to increase the area of each point contact formed by the intersections of the ribs of the dies. For example, when the ribs are aligned at an angle of 45°, the area of each point contact is twice the area of each point contact when the ribs are parallel to the longitudinal axis. An angle between about 0° and 30° with respect to the longitudinal axis, corresponding to an angle between about 90° and 60° with respect to the back die, is preferred.

Accordingly, an important advantage of this invention is that for a particular film, it permits one to form a heatseal having the desired heatseal strength by simply using the appropriate die bar for that film. Another important advantage is that it permits one to quickly change over from one type of film to another by simply changing the die bar.

I claim:

1. A method of forming an easily openable gastight heatseal between two heatsealable surfaces of a film comprising pressing the surfaces together between two opposed heated die faces, each die face having a plurality of ribs aligned such that the ribs on one die face form an angle of at least 5° with the ribs on the other die face and intersect the ribs on the other die face, thereby forming a pattern of point seals between the two surfaces of the film at the places where the ribs intersect, the pattern of point seals forming the easily openable gastight heatseal.

2. The improvement of claim 1 wherein the angle is about 90°.

3. In apparatus for forming a gastight heatseal between two heatsealable surfaces of a film, and having opposed, ribbed die faces between which the surfaces are pressed together and heated to form the heatseal, the improvement wherein the ribs of one of the die faces are aligned at an angle of more than about five degrees with the ribs of the other die face and thereby intersect the ribs of the other die face such that a pattern of point seals is formed when the two surfaces of the film are pressed between the die faces, the pattern of point seals forming the gastight heatseal.

4. The improvement of claim 3 wherein the angle is about 90°.

5. In apparatus for forming two gastight heatseals between two heatsealable surfaces of a film, the apparatus having a back die with a ribbed die face and an opposed die adapted to be pressed against the back die to form the heatseals, the improvement wherein the opposed die comprises a first die bar having a die face with generally parallel ribs which mesh with the ribs of the back die such that a heatseal having a serrated surface is formed when the two surfaces of the film are pressed between the two dies, the ribs of the first die bar being aligned normal to the longitudinal axis of the first die bar, and a second die bar having a longitudinal axis which is generally parallel to the longitudinal axis of the first die bar and having generally parallel ribs aligned at an angle of from about 0° to 85° with respect to the longitudinal axes and aligned at an angle of more than about 5° with the ribs of the back die and thereby intersect the ribs of the back die such that a pattern of point seals is formed when the two surfaces of the film are pressed between the two dies, the pattern of point seals forming the second gastight heatseal.

6. The improvement of claim 5 wherein the ribs of the second die bar are parallel to the longitudinal axes.

7. The improvement of claim 6 wherein the second die bar is detachable.

8. The improvement of claim 7 wherein the second die bar has a recess along its longitudinal edge adjacent the first die bar, the width of the recess being at least 2 inches.

9. The improvement of claim 8 wherein the recess is a bevel located substantially at the center of the edge.

* * * * *